(12) United States Patent
Baker

(10) Patent No.: US 7,562,015 B2
(45) Date of Patent: Jul. 14, 2009

(54) DISTRIBUTED PATTERN RECOGNITION TRAINING METHOD AND SYSTEM

(75) Inventor: James K. Baker, Maitland, FL (US)

(73) Assignee: Aurilab, LLC, Maitland, FL (US)

( * ) Notice: Subject to any disclaimer, the term of this patent is extended or adjusted under 35 U.S.C. 154(b) by 606 days.

(21) Appl. No.: 11/180,600

(22) Filed: Jul. 14, 2005

(65) Prior Publication Data

US 2006/0015341 A1    Jan. 19, 2006

Related U.S. Application Data

(60) Provisional application No. 60/587,874, filed on Jul. 15, 2004.

(51) Int. Cl.
*G10L 15/00* (2006.01)
(52) U.S. Cl. .................. 704/243; 704/244; 704/250; 709/218; 709/219
(58) Field of Classification Search ............... 704/243, 704/244, 255; 709/218, 219
See application file for complete search history.

(56) References Cited

U.S. PATENT DOCUMENTS

| | | | |
|---|---|---|---|
| 4,718,088 A * | 1/1988 | Baker et al. .................. 704/241 |
| 5,751,898 A * | 5/1998 | Kosaka et al. ................ 704/241 |
| 6,411,930 B1 * | 6/2002 | Burges ........................ 704/240 |
| 6,732,072 B1 | 5/2004 | Pearce et al. |
| 6,785,654 B2 | 8/2004 | Cyr et al. |
| 7,069,257 B2 | 6/2006 | Huang |
| 7,295,978 B1 * | 11/2007 | Schwartz et al. ............. 704/240 |
| 2003/0120493 A1 * | 6/2003 | Gupta ....................... 704/270.1 |
| 2004/0002928 A1 * | 1/2004 | Huang ........................... 706/20 |
| 2004/0167770 A1 * | 8/2004 | Zhuo et al. ...................... 704/4 |
| 2006/0149558 A1 * | 7/2006 | Kahn et al. .................. 704/278 |

* cited by examiner

*Primary Examiner*—Daniel D Abebe
(74) *Attorney, Agent, or Firm*—Foley & Lardner LLP

(57) ABSTRACT

A distributed pattern recognition training method includes providing data communication between at least one central pattern analysis node and a plurality of peripheral data analysis sites. The method also includes communicating from the at least one central pattern analysis node to the plurality of peripheral data analysis a plurality of kernel-based pattern elements. The method further includes performing a plurality of iterations of pattern template training at each of the plurality of peripheral data analysis sites.

34 Claims, 6 Drawing Sheets

DISTRIBUTED PATTERN RECOGNITION TRAINING METHOD AND SYSTEM

RELATED APPLICATIONS

This application claims priority to provisional patent application 60/587,874 entitled "Distributed Pattern Recognition Training System and Method," filed Jul. 15, 2004, which is incorporated in its entirety herein by reference.

BACKGROUND OF THE INVENTION

A. Field of the Invention

The invention relates to a distributed pattern recognition training system and method.

B. Description of the Related Art

In recent years, speech recognition systems have become capable of recognizing very large vocabularies, exceeding 200,000 words in some cases. Training these speech recognition systems requires a large amount of data. Thousands of hours of spoken training data may be used to train the acoustic models for a large vocabulary speech recognizer and billions of words of text may be used to train the language context models. In addition to the speech recognition itself, some applications of speech recognition also require large amounts of data. Training speech recognition post analysis systems to determine semantics or other hidden features (for applications such as audio data mining or to control an interactive dialogue) may require even more data than for the speech recognition itself.

Building higher-performance speech recognition and post analysis systems will require even more data than is being used in present systems. As the models become more sophisticated and more detailed, they require more data to train the larger number of parameters that determine the models. For an n-gram language model, for example, the number of possible n-grams is multiplied by a factor of the vocabulary size for each increase in the value of n by one. Similarly, the number of parameters in acoustic models grows by a multiplicative factor for each additional amount of context that is used.

Better pattern recognition based on language analysis is also valuable for analysis of any large collection of text, whether the text results from speech recognition or not. Training models for this language analysis of general text runs into the same issues as for the post analysis of speech recognition. A large quantity of training data is needed to train increasingly sophisticated models. Pattern recognition is also useful for mining data in large data collections for any type of data. Again, if this pattern recognition is based on models that look at the relationships between elementary events and variables, a large quantity of training data is needed in order to train the large number of combinations.

Fortunately, an enormous quantity of data is potentially available. A large telephone call center may record several million hours of recorded speech per month. The World Wide Web contains about 40 terabytes or more of text, and is continuing to grow rapidly.

Unfortunately, most pattern recognition methods are not able to cope with such enormous quantities of data. Many pattern recognition techniques are first developed on small sample academic problems and then, with great effort, are made scalable enough to handle real world problems with thousands of data frames. To train the higher-performance speech recognition and post analysis systems that take advantage of the large quantity of data available will require methods capable of handling billions of frames of data.

Not only is there a very large quantity of data available, but new data is being produced continuously. For many applications, it is important to keep the vocabulary and language context models up to date. For many data mining applications, it is also important to keep the models up to date. The queries that the public are likely to make to a telephone help desk, for example, will change as new products are introduced. Other classification applications may require tracking current events in the news. New proper names will be introduced to the vocabulary on an on-going basis for many applications. Both the acoustic models and the language context models must be updated to reflect these changes. However, this new data becomes available at many separate sites.

Thus, there is a desire to address one or more of the problems described above in conventional pattern recognition training methods and systems.

SUMMARY OF THE INVENTION

According to one aspect of the invention, there is provided a distributed pattern recognition training method, which includes providing data communication between at least one central pattern analysis node and a plurality of peripheral data analysis sites. The method also includes communicating from said at least one central pattern analysis node to said plurality of peripheral data analysis a plurality of kernel-based pattern elements. The method further includes performing a plurality of iterations of pattern template training at each of said plurality of peripheral data analysis sites.

According to another aspect of the invention, there is provided a speech recognition method, which includes performing a base speech recognition process which generates utterance hypotheses. The method also includes obtaining a representation of a set of event types which may occur in utterance hypotheses generated by said base speech recognition process. The method further includes obtaining a plurality of hypothesized event pair discrimination models. The method still further includes obtaining a plurality of utterance hypotheses from said base speech recognition process. The method also includes selecting at least one pair from said plurality of utterance hypotheses. For each selected pair of utterance hypotheses, the method includes selecting at least one point in time such that within a specified interval of said point in time a first hypothesized particular event happens according to a first hypothesis of said pair of utterance hypotheses and a second hypothesized particular event happens according to a second hypothesis of said pair of utterance hypotheses. The method also includes obtaining data observations at said at least one point in time. The method still further includes rescoring said pair of utterance hypotheses based at least in part on said event pair discrimination models and said data observations at said at least one point in time. The method yet still further includes re-ranking said plurality of hypotheses based on said rescoring of said selected at least one pair from said plurality of hypotheses.

According to yet another aspect of the invention, there is provided a two stage speech recognition method, which includes obtaining a base recognition process which generates utterance hypotheses. The method also includes obtaining a representation of the set of event types which might occur in utterance hypotheses generated by said base speech recognition process. The method further includes obtaining a plurality of self-normalizing event detection verification models trained at least in part on errors made by said base speech recognition system. The method still further includes obtaining a plurality of hypotheses from said base speech recognition system. For each of said plurality of hypotheses, the method includes obtaining a list of hypothesized events which happen according to said hypothesis and the hypothesized time at which each of said events occurs. The method also includes rescoring each of said plurality of hypotheses by adding the output score from the event detection verification model for each event in said list of hypothesized events. The method further includes re-ranking said plurality of hypotheses based on said rescoring and basing the output of said two stage speech recognition method on said re-ranking.

According to yet another aspect of the invention, there is provided a pattern scoring method, which includes obtaining a plurality of template data items. The method also includes obtaining a plurality of kernel functions. For each of said plurality of template data items, the method includes creating a plurality of functionals where each particular functional is associated with a particular template data item and a particular kernel function. The method also includes computing the score for each sample data item based on the value of a linear combination of a subset of said plurality of functionals. For each pattern to be scored, the method includes selecting the particular functionals to be used and the weight to be given to each particular functional based on a constrained optimization problem which minimizes a function of the weights for a given amount of separation between the pattern classes.

BRIEF DESCRIPTION OF THE DRAWINGS

The foregoing advantages and features of the invention will become apparent upon reference to the following detailed description and the accompanying drawings, of which.

DETAILED DESCRIPTION OF THE INVENTION

Figure 1:
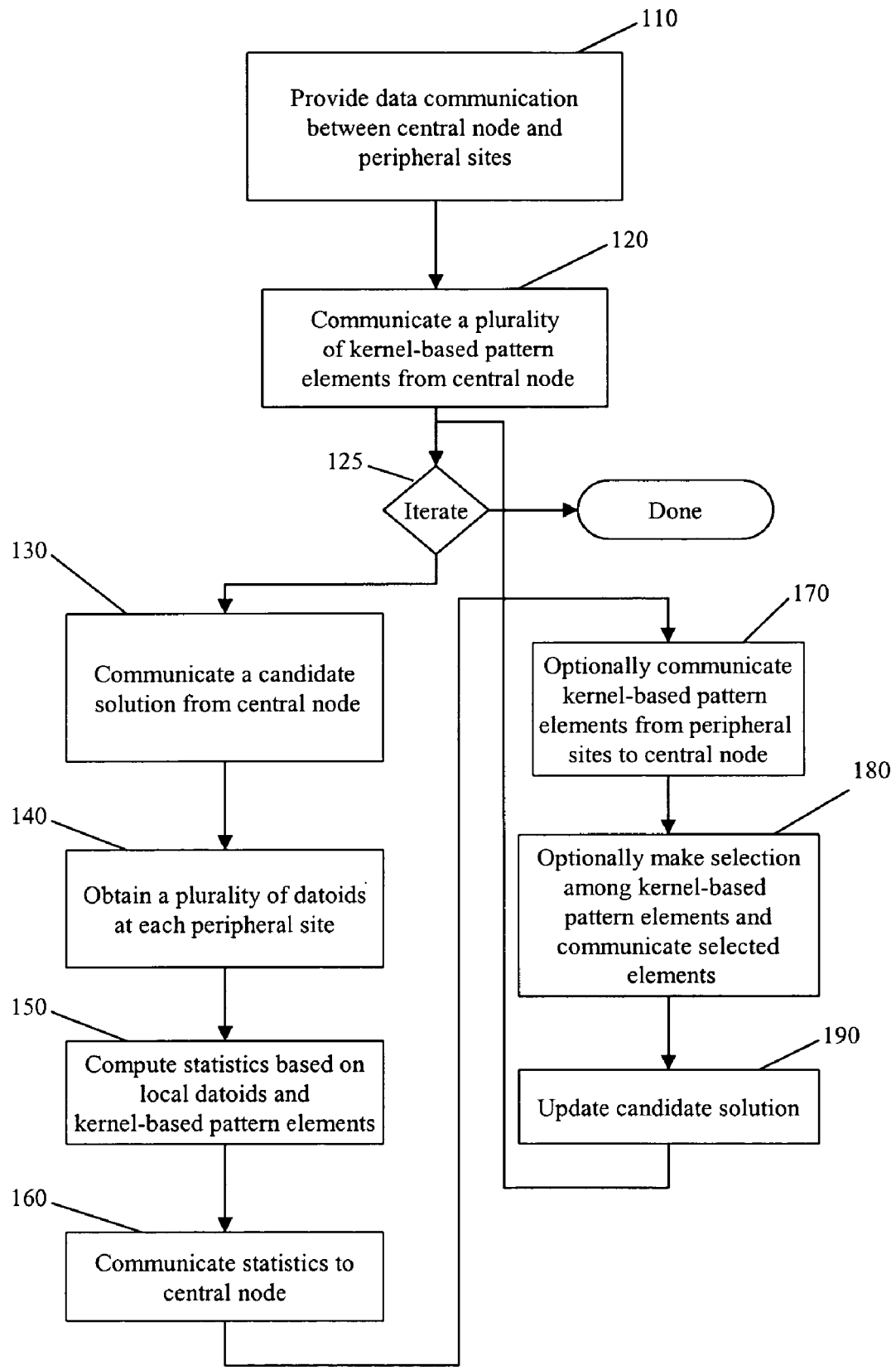
FIG. 1 is a flowchart of a pattern recognition training method according to a first embodiment of the invention.

A detailed description of the invention is provided herein, with reference to the accompanying drawings.

The invention is described below with reference to drawings. These drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention will be described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

Before describing embodiments of the invention in detail, definitions are provided hereinbelow to assist in the understanding of those various embodiments.

The Data Space (or Observation Data Space) D is the set of possible observations. D is often a vector space such as the space of n-dimensional vectors of real numbers, but it can be any set. In particular, the Data Space often includes symbol sequences of varying, rather than a fixed length. The symbols in the sequences, or in certain positions in the sequence, may be elements from a finite set rather than from the set of real numbers.

A Datoid or data item is any point in the Data Space D. A point d in D is called a Datoid whether d is an actual observation or merely an arbitrary point in D chosen by some other means.

A Functional is a mapping (i.e. a function) from D to the set of real numbers R.

A Hilbert Space is a metric space that is linear and topologically complete. That is, a Hilbert Space is a vector space with an inner product such that the limit of any sequence of points in the space is also in the space. A Hilbert space may be infinite dimensional.

A Hilbert mapping is a mapping from D into a Hilbert space H.

A Kernel Function K(x,y) is a mapping from $D^2$ into the set of real numbers R. A kernel function K(x,y) is positive semi-definite if for all x in D, K(x,x) 0.

A Reproducing Kernel is a kernel function that is positive-semidefinite.

A Reproducing Kernal Map is a mapping : x→K(.,x), where K is a kernel function. That is, to each point x in D we associate a function K(.,x) from D into the set of real numbers R (i.e. a functional). Now form the vector space of all linear combinations of the functions K(.,x), that is, all functions of the form $$f(.) = \sum_{i=1}^{m} a_i K(., x_i)$$

Let $g(.) = \sum_{j=1}^{m} b_j K(., y_j)$.

Define the inner product $$\langle f, g \rangle = \sum_{j=1}^{m} \sum_{i=1}^{m} a_i K(x_i, y_j) b_j.$$

The completion of this vector space then forms a Hilbert space, called a Reproducing Kernel Hilbert Space with the kernel K.

The norm of a function f in this Hilbert space is given by $\|f\|=<f, f>$. The inner product in the Hilbert space induces a metric or distance function in D defined by d (x, y)=<K(., x), K(., y)>.

Let $F=\{f_1, f_2, f_3, \ldots, f_N\}$ be a set of N functionals. Then a composite function of the set F is a function of the form $G(x)=g(f_1(x),f_2(x),\ldots,f_N(x))$, where g is a function from $R^N$ into R.

Because the metric on data items is induced by a kernel and a functional may be specified as a kernel function evaluated at a particular data item, each of these elements will be called a "kernel-based pattern element," or simply a "pattern element." In at least one embodiment of the present invention, candidate solutions to a given discrimination or pattern classification problem are constructed as linear combinations or other computable functions of pattern elements.

Thus, a Kernel-Based Pattern Element for a data space D is defined to be either a data item, a functional or a kernel for the data space D.

An event detection verification model for an event E is a functional on a data space D which is trained to attempt to have a value in a specified range for data items that are associated with the known occurrence of the event E and to attempt to have a value not in the specified range for data items that are associated with the known absence of the event E.

A self-normalizing event detection verification model is an event detection verification model in which zero is a separation point between the ranges and further that the functional is trained to have an average value which is less in absolute value than some specified value δ. In one possible implementation of this embodiment, an event detection verification model for a particular event is trained to attempt to produce an output score at a particular numeric sign whenever a base recognition system incorrectly scores a hypothesis not containing the particular event as better than a hypothesis containing the particular event. The event detection verification model for the particular event is trained to attempt to produce an output score of an opposite numeric sign whenever the base recognition system incorrectly scores a hypothesis containing the particular event as better than a hypothesis not containing the particular event.

It has been recognized by the inventor that, to be practical, a pattern recognition training method should be capable of operating in a distributed computing environment. With a distributed implementation, thousands of computers could cooperate in the data analysis and pattern training task. Ideally the method should only require communication between the cooperating computers for a small fraction of the data that is available on the total network, rather than making many complete copies of the entire data corpus.

However, most existing speech recognition systems have been designed to have the acoustic model training and the language context model training done at a single central site, before the system is shipped to end users. They have not been designed to train these models continuously from new data gathered in the field. When adaptive training is done by a single end user, it is not communicated back to the central site, much less to other users of the same recognition system. Worse still, there is no underlying knowledge representation mechanism. For example, once the acoustic models have been adapted to different individual users, there is no mechanism to guarantee that a particular low level unit, say a particular component of a mixture of Gaussian distributions, still represents the same collection of sounds for one user as for another. Thus there is no common "language" in which the distributed systems could even in principle communicate the new knowledge that they learn. With these points in mind, the inventor has come up with different embodiments of the invention.

Embodiments of the invention will now be described in detail, with reference to FIGS. 1-6. Referring to FIG. 1, which corresponds to a first embodiment, in block 110 data communication is provided between a central node and a plurality of peripheral sites, to thereby provide a distributed computer architecture. This data communication is not limiting on the invention. In one embodiment, the communication could be electronic, and in another embodiment the communication could be via a data carrier such as a Compact Disk delivered by mail. The first embodiment uses such a distributed architecture for several reasons, to be explained in detail below.

The distributed architecture of the first embodiment allows the system to handle very large quantities of data. For example, in a speech recognition application, the first embodiment is capable of handling millions of hours of recorded speech samples, whereas even the largest prior art systems generally handle at most a few thousand hours of recorded speech samples. As another example, the first embodiment is capable of handling text and language modeling knowledge representations requiring petabytes (millions of gigabytes) rather than gigabytes of storage. The first embodiment is also capable of handling data mining problems with extremely large data sets. A distributed architecture, perhaps using thousands of computers, is more capable of handling such large quantities of data.

Secondly, the first embodiment is capable of using a continuing, on-going data collection process. In many applications, this on-going data collection takes place at many, physically separated sites. In such a case, it is more efficient if much of the processing can be done locally at the data collection sites.

In large scale implementations, each peripheral site and especially the central processing node may themselves be large networked data centers with many processors each. The functional characteristic that distinguishes the peripheral data sites from the central node is that, as part of the first embodiment, peripheral sites do not need to communicate directly with each other, whereby they only need to communicate with the central node. Within any one site or the central node, all the processors within a multiprocessor implementation may communicate with each other without restriction.

The first embodiment permits a large collection of data observations at each peripheral site, with only a small fraction of this data ever needing to be communicated to the central node. As will be seen in the discussion of FIGS. 1-5, large quantities of data may be communicated between the peripheral sites and the central node, but the communication is restricted. Although it may be a large quantity, it may nonetheless be a small fraction of all the data available at the peripheral sites. In some configurations, there may be a communication network between the sites and the central node, but with limited bandwidth. In other configurations, the communication may be implemented by physically shipping storage media between sites, which allows a large quantity of data to be communicated, but restricted to the time scale required for transport of physical media.

In block 120, a plurality of kernel-based pattern elements, related to a designated data space D, are communicated from the central node to the peripheral sites. These kernel-based pattern elements are used as elements in the solution to an optimization problem. By way of example and not by way of limitation, the pattern optimization problem may be to find the best linear combination of a set of functionals on D given a particular objective function and subject to certain equality and inequality constraints. In this example, the set of functionals would be communicated in block 120. In other possible embodiments, data items and one or more kernel functions may be communicated in block 120. Given a communicated or pre-specified kernel function K(.,.), a peripheral site may construct a functional from any data item d, whether already known at the peripheral site or communicated from the central node, as follows:

$$\phi_d(.)=K(.,d) \tag{0.1}$$

As mentioned, the kernel-based pattern elements communicated in block 120 are to be used in the solution of an optimization problem. Before completing the discussion of FIG. 1, reference is made to FIG. 2 to provide an understanding of the source and nature of this optimization problem. In one possible implementation, a plurality of reproducing kernel functions are communicated from the central pattern analysis node to the plurality of peripheral data analysis sites. The reproducing kernel functions may be, for example, a function of the covariance matrix of a plurality of data vectors. Statistics communicated from a particular one of said plurality of peripheral data analysis sites may include a vector proportional to the direction in which to change at least one of the reproducing kernel functions to get the greatest rate of improvement of the degree of fit between the plurality of peripheral data items obtained at a particular one of said data analysis sites and a family of functionals based on at least one reproducing kernel function.

Figure 2:
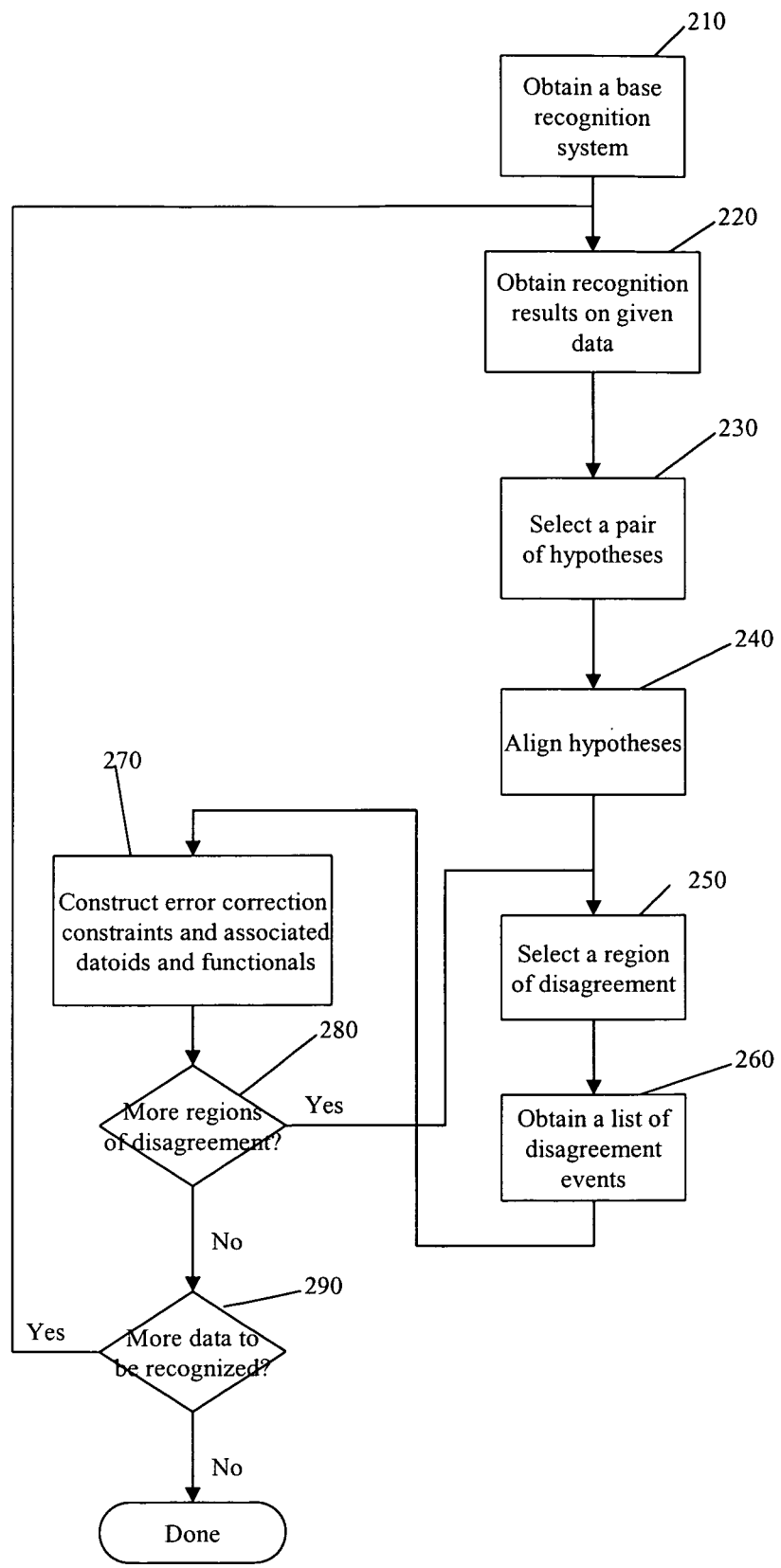
FIG. 2 is a flowchart of a process that is useful in understanding the pattern recognition training method of FIG. 1.

In block 210 of FIG. 2, a base recognition system is obtained. By way of example, and not by way of limitation, the base recognition system may be a speech recognition system which puts out a list of best matching hypotheses for each block of speech data, such as sentences or utterances. As a second example, the base recognition system may be a category classification system, for example, it may classify the recognized word sequences in a spoken dialog into categories in order to determine which of several responses to make as the system's next turn in the dialog.

In block 220, recognition results (e.g., recognized words) are obtained from the base recognition system on a given block of data.

In block 230, a pair of hypotheses to be compared are selected. By way of example, and not by way of limitation, in the case of supervised or semi-supervised training, the pair of hypotheses may include the best scoring hypothesis and a hypothesis which, based on the supervision, is known to be or is believed to be more likely to be the correct hypothesis than is the best scoring hypothesis. Thus, to improve the performance of the system, it is desirable to improve the relative score of the hypothesis that, given the supervision, is believed to be more likely to be correct than the currently best scoring hypothsis.

In block 240, each of the hypotheses is aligned to the data. In some cases, no alignment is necessary, such as for category recognition in which the features or functionals depend only on which words occur and not on their relative positions in the word sequence. In a general data mining task, alignment might or might not be appropriate, depending on the nature of the data record. When alignment is needed, it may be done by dynamic time warping or forced alignment, procedures which are well-known to those skilled in the art of speech recognition, and illustrated in pseudo-code A provided below.

In block 250, an area of disagreement is selected. For some speech recognition tasks, there are base recognition systems in which more than 90% of the words are correctly recognized. In other tasks, perhaps only 70% of the words may be correct. Typically, the two selected hypotheses will have alternating regions, first agreeing on several words, then disagreeing on one or more words, then agreeing again, and so on. Although the first embodiment can take the whole sentence or utterance as an area of disagreement, block 250, not by way of limitation, does a simplification. In the first embodiment of block 250, each area of disagreement is treated separately, and the constructions in block 260 and block 270 are done for each separate area of disagreement. For example, the two selected hypotheses may disagree in three places in their hypothesized word sequences, but each disagreement might be only a single word, surrounded by words on which they agree. Then, in block 250 each word disagreement is selected separately. However, if the two hypotheses disagree on several words in a row, then the entire area of disagreement will be taken together. In the case in which alignment is not performed in block 240, then the entire block of data is taken as a single area of disagreement.

In block 260, a list of disagreement events is obtained. An event is an observation of a data item from a data space D associated with a symbolic label in a hypothesis. A disagreement event is an event in which the two selected hypotheses have different symbolic labels associated with the same data item. For example, one hypothesis might have the word "brown" whereby the other hypothesis has the word "frown." If the data items are vectors of acoustic features, and if the acoustic features are modeled based on the phonemes or sounds within each word, then the disagreement event would be the phoneme /b/ aligned against a sequence of one of more data items versus the phoneme /f/. The alignment may include some of the context, if the two hypothesized phonemes do not align identically.

The association of a time (or more generally a position in a sequence) with an event may take several forms. Continuing the example of "brown" versus "frown", the phonemes /b/ and /f/ would generally each be associated with an acoustic segment over an interval of time. Thus, by way of example and not by way of limitation, the disagreement event type might take the following form:

</b/,/f/>: During some time interval hypothesis Hi includes the phoneme /b/ and not the phoneme /f/, whereas hypothesis H2 includes the phoneme /f/ and not the phoneme /b/. Furthermore, the acoustic interval associated with the H1 hypothesis of /b/ overlaps the acoustic interval associated with the H2 hypothesis of /f/.

On the other hand, some event types are more naturally associated with a point in time rather than an interval. For example, one hypothesis might have the word "meek" where the other hypothesis might have the word "leak" and rather than (or in addition to) phoneme events, the events might be associated with acoustic landmarks. Acoustic landmarks are associated with events such as a change in manner of articulation, for example, a transition from a consonant to a vowel. Thus, in the given example, the hypothesis "meek" would have an acoustic landmark associated with the end or release of the nasal "m" and the hypothesis "leak" would have an acoustic landmark associated with the end or release of the lateral "l". Event types may include at least one event of the form that a particular phoneme occurs during a time interval that overlaps with a given time period. Event types may also include at least one event of the form that an acoustic segment boundary of a specified type occurs within a specified interval of a given point in time. Event types may further include at least one event of the form that a particular word occurs at a particular point in a word sequence.

In the first embodiment, each hypothesized acoustic landmark is associated with a particular time according to the time alignment for its particular hypothesis. The nature of the data, however, would generally cause the time aligned to the "m" release to be close to the time aligned to the "l" release, because both would be associated with a sudden increase in energy from the consonant to the vowel.

Thus, in this example, the disagreement event type might take the following form: <nasal release, lateral release>: Hypothesis H1 includes a nasal release at time t1 and hypothesis H2 includes a lateral release at time t2. The difference in time |t1-t2| is less than some specified limit (say 60 milliseconds) and neither hypothesis has any other consonant/vowel transition between t1 and t2.

In other possible implementations of the first embodiment, events might not be associated with times at all, but only with positions relative to other events. For example, in the recognition of conversational categories in a dialog systems, the data might be the sequence of word IDs, without associated times. In this example, an event might be occurrence of a particular word or of a word of a particular type in a given context or at a given position in the word sequence. For example, one hypothesis might be that someone calling a real estate broker wants to find "the right house" to live in. However, a presidential candidate might be soliciting votes in order to live in "the White House." In data mining applications, the events might be associated with the values in particular fields in a data record, in the context of certain values observed or hypothesized for other fields in the data record.

Also, note that in these examples the data items are not vectors of real numbers, but rather are word IDs at given positions in the word sequence or values in arbitrary fields in a database record. In one possible implementation of the first embodiment, each word is further represented as a vector of features, but the features relate to linguistic properties of each word, such as syntactic and semantic category labels rather than numeric measurements. However, this implementation does not require the data space to be a vector space and, if the data is a vector of features, does not require the features to be numeric with values in the set of real numbers. The first embodiment forms linear combinations of functionals on the data space, but does not require linear combinations of the data points themselves.

In block 260, all events are found for which the two selected hypotheses differ in the selected region of disagreement.

In block 270, a set of error correction constraints is constructed. The purpose of these constraints is to define a constrained optimization problem that formulates the problem of correcting the errors made by the base recognition system. The constrained optimization problem will compute score corrections to be added to the scores of the base recognition system. These score corrections will be computed as linear combinations of functionals on the data space D. Note that, whether or not the space D forms a vector space, the space of functionals on D will always form a vector space (perhaps infinite dimensional), so it is meaningful to form linear combinations of functionals.

Whether at the central node or at a peripheral site, there will be set of kernel-based pattern elements. From these kernel-based pattern elements, a set of functionals is constructed. If the functionals are explicitly communicated, then they may be used directly. In the case in which functionals are communicated, it is not necessary to use kernels at all, so the phrase "kernel-based pattern elements" is intended to include the case in which functionals are communicated directly with or without associated kernels.

If data items and kernels are communicated, or if data items are communicated and one or more kernels are determined beforehand, then a functional may be constructed from each pair of one data item and one kernel, as described in reference to block 120 of FIG. 1. If the data items are vectors of real numbers, then for each component of the vector there is an implicit functional that includes selection of the particular component. Linear combinations of these vector component functionals is equivalent to linear regression. As another example, if the space D is a finite vector space, then the Euclidean distance may be used as a kernel, and no kernel needs to be explicitly communicated. Other kernels may be used to implement more general forms of non-linear regression.

In one possible implementation of the first embodiment, many different kernels may be used and thus there may be many different functionals associated with a single data item. Consider again the example of word sequences as data for classifying dialog categories. Consider, in particular, kernel functions that associate words that tend to occur together in the same sentence. Then a word such as "bank" would have several kernel functions: one dealing with a bank as a financial institution, one dealing with the bank of a river, and one dealing with a bank shot as in the game of billiards. For any data item (sentence) containing the word "bank" there would be a functional derived from each of these kernel functions.

Given a set of functionals, the first embodiment constructs a constraint for a constrained optimization problem by constructing an inequality specifying that a linear combination of the given functionals produce a score change sufficient to correct the recognition error in the area of disagreement. In the first embodiment, each disagreement event is treated separately, producing a constraint for each disagreement event. In one possible implementation, the kernel-based pattern elements contain at least one data item, and are matched to a plurality of peripheral data items. For example, the matching may involve computing the distance between at least one data item from a kernel-based pattern element and each of a plurality of peripheral data items based on a distance metric. The distance metric may be a Euclidean distance metric or a reproducing kernel in a Hilbert space, by way of example.

In the first embodiment, the constraint constructed has the form $$y_{k,i} \sum_j w_{k,j} \varphi_{k,j}(x_i) + \xi_{k,i} \geq d_{k,i}, \quad (0.2)$$

where $\phi_{k,j}(.)$ are the given set of functionals, $x_i$ is the data item associated with a particular disagreement event, k is an index determined by the type of event disagreement, as discussed below, $d_{k,i}$ is a quantity determined by the amount that the score of the base recognition system needs to be corrected, $y_{k,i}$ is +1 or −1, depending on the desired direction of the decision, $\xi_{k,i}$ if >0, measures the amount by which the desired constraint has failed to be satisfied.

For each index k, there are a set of such inequality constraints, one for each disagreement event of the type indicated by the index k in the whole data corpus. In addition, there will be an objective function to be minimized involving the weights $w_{k,j}$ and a penalty term involving the variables $\xi_{k,i}$, which are constrained to be non-negative.

The index k represents the type of event disagreement. In the first embodiment, an event disagreement type is an ordered pair k=<$K_1$, $K_2$> where $K_1$ and $K_2$ are each elementary events aligned to the data item $x_i$ or the special "event", representing the fact that the given hypothesis aligns no elementary events to the given data item. Thus an index k can represent the fact that the two hypotheses align different elementary events to the data item $x_i$, or that one hypothesis aligns an event to $x_i$ and the other hypothesis aligns no event to $x_i$.

For a given index k=<$K_1$, $K_2$> and a given disagreement event, the weighted combination of the functionals $$\sum_j w_{k,j} \varphi_j(x_i)$$

is used as a discriminator between $K_1$ and $K_2$. Thus when $$\sum_j w_{k,j} \varphi_j(x_i) > 0, K_1$$

is favored and when $$\sum_j \dot{w}_{k,j} \varphi_j(x_i) < 0,$$

$K_2$ is favored. For a given disagreement event, either $K_1$ or $K_2$ may be the correct answer. The value of $y_{k,i}$, which is −1 or +1, is set such that it is always desired that $$y_{k,i} \sum_j w_{k,j} \varphi_j(x_i) > 0.$$

The value of $d_{k,i}$ is set so that, if the constraints is satisfied (with $\xi_{k,i}$=0), then the value of the sum $$\sum_i y_{k,i} \sum_j w_{k,j} \varphi_j(x_i),$$

where the sum is over all disagreement events in a given disagreement region, is sufficient to correct the score difference in the base recognition system between the best scoring hypothesis and the correct hypothesis. In addition, $d_{k,i}$ is set so that there is a bit of extra margin so that the same combination of functionals will also correctly classify other similar examples.

Thus, by way of example, and not by way of limitation, it could be determined by $$d_{k,i} = \frac{D_r}{N_r} + d, \quad (0.3)$$

where $D_r$ is the amount of score difference in disagreement region r, $N_r$ is the number of disagreement events in the region r, d is the desired margin in the classification.

As an alternate implementation of the first embodiment, the division by $N_r$ may be left out. In this alternate implementation, each disagreement event is made responsible for correcting the entire score error of the base recognition system, whereas in the first embodiment each disagreement event is only responsible for the average amount of correction needed, shared among all the disagreement events in the region. However, the discriminators for some of the events may fail to do their required share, making the total fail even when most of the discriminators satisfy their constraints. On the other hand, individual constraints and the total may fail if a value $\xi_{k,i}$>0 must be used to satisfy the constraint, which is more likely to be necessary in the alternate embodiment. In any case, later iterations are available to correct errors that are not corrected in a single iteration.

Besides iterating the training step, the first embodiment has an additional mechanism for making further correction in disagreement regions that do not at first get fully corrected. In the first embodiment, the process of constructing and training a set of discriminators is done a plurality of times. In the first embodiment, a set of one or more previously trained discriminators is kept fixed, that is, it is at least temporarily not retrained or updated, and is made part of the "base recognition system" in the sense that the term "base recognition system" is used relative to the training of the discriminators currently being trained. Thus, especially if the first set of discriminators correctly classify some of the disagreement events, the second set of discriminators will have a different, easier correction task to solve. This process may be repeated many times to build multiple sets of discriminators. In addition, a set of discriminators that has been temporarily fixed and made part of the base recognition system may later be retrained with other sets of discriminators, including those trained later, having been fixed and made part of a new base recognizer.

It may be observed that if $$y_{k,i} \sum_j w_{k,j} \varphi_j(x_i) > 0$$

then it is always possible to achieve $$y_{k,i} \sum_j w_{k,j} \varphi_j(x_i) > D$$

for any value of D simply by making the weights $w_{k,j}$ as large as necessary. In the first embodiment, the constraints of the form in (0.2) are used in a constrained optimization problem in which the objective function will depend on the weights, such as (0.4) Minimize $$\text{Minimize } W = \sum_j |w_{k,j}| + C \sum_i \xi_{k,i}. \quad (0.4)$$

Thus the constraints (0.2) are satisfied by weights as small as possible subject to a trade-off to keep the sum of the failure amounts as small as possible. The objective function (0.4) leads to a linear programming problem. Another possible implementation of the first embodiment uses the alternate objective function (0.5) Minimize $$\text{Minimize } W = \sum_j (w_{k,j})^2 + C \sum_i \xi_{k,i} \quad (0.5)$$

which leads to a quadratic programming problem. Both objective functions (1.4) and (1.5), with the constraints (1.2), are instances of convex programming problems. In either case, the value of C is selected in the first embodiment by using a range of values of C on practice data and choosing the most effective value.

Returning now to FIG. 2, the construction of error correction constraints in block 270 has been explained above.

In block 280, a check is performed to see if there are more regions of disagreement for the selected pair of hypotheses. If so, control is returned to block 250 and each region of disagreement is treated as described above.

If there are no more regions of disagreement for the selected hypothesis pair, control goes to block 290, which checks to see if there is more data to be analyzed. If so, control returns to block 220. Otherwise, the process illustrated in FIG. 2 is complete.

Returning now to FIG. 1, block 120 may now be better understood in light of the process illustrated by FIG. 2 and discussed in detail above. In block 120, kernel-based pattern elements are communicated to each peripheral site so that each peripheral site may construct functionals to be used to construct discrimination constraints, as illustrated in FIG. 2. Also, in block 120, data items are communicated for each peripheral site to be used in addition to the locally obtained data items in the set of data items for which each peripheral site constructs constraints of the form (0.2).

In block 125, control is performed for iterating of the processes of collecting data, communicating between the peripheral sites and the central node, and updating the candidate solution to the optimization problem. In some possible implementations of the first embodiment, the updating of pattern models may be iterated in block 125 until a particular criterion is met, such as that the change in the models from a previous iteration is less than some specified amount. In one possible implementation of the first embodiment, however, new data continues to be collected and the iterative improvement in the pattern models continues indefinitely.

In block 130, a candidate solution is communicated from the central node for the designated optimization problem. As discussed in reference to FIG. 2, there may be many such pattern discrimination problems, one for each disagreement type $k=(K_1,K_2)$. In the first embodiment, the process shown in FIG. 1 would be done separately for each disagreement type. For example, if the events are phoneme boundaries, then there may be over 1,000 distinct phoneme pairs and therefore more than 1,000 different types of phoneme boundaries. That is, there may be over 1,000 different values each for $K_1$ and for $K_2$ and thus over one million possible values for the pair $k=(K_1,K_2)$.

By way of example and not by way of limitation, the candidate solution may be a linear combination of a selected set of functionals, that is, it may comprise for a given disagreement type k a set of functionals $\{\varphi_{k,j}\}$ and weights $w_{k,j}$ to satisfy constraints of the form (0.2).

In block 140, a plurality of data items are obtained at each peripheral site. In the first embodiment, each data item has two distinct potential roles. First, each constraint of the form (0.2) involves a particular data item $x_i$. Secondly, any data item x may be used in combination with a kernel function K(.,.) to create a functional as in (0.1).

In block 150, statistics are computed based on the data items obtained in block 140 and the kernel-based pattern elements communicated from the central node in block 120 and block 130. As will be described in more detail in reference to FIG. 3 and FIG. 4, these statistics are used for computing the next iteration of the solution to the designated optimization problem. The computation in block 150 will be described in more detail in reference to FIG. 3 and FIG. 4.

In block 160, the statistics are communicated back to the central node from the peripheral sites. These statistics may be communicated by way a network, such as a Local Area Network, a Wide Area Network, the Internet, or by other known communications mediums.

In block 170, kernel-based pattern elements are communicated from the peripheral sites to the central node. In the first embodiment, the data items which are obtained at the peripheral sites are not all communicated to the central site. Thus, the central node cannot directly compute whether the constraint associated with a particular data item is violated, or by how much. Statistics related to these data items and the associated constraints may be included in the statistics computed in block 150 and communicated in block 160. In addition, based on criteria set by the system designer based on the amount and cost of communication bandwidth, for some iterations block 170 may select and communicate some of the data items themselves, or may communicate functionals derived from selected data items. Communicating a data item to the central node allows the central node to directly evaluate the constraint associated with the data item and to construct functionals based on the data item. Thus, in block 170 those data items will be selected with the greatest need for improvement in their associated constraints.

In block 180, a further selection process is optionally performed, whereby a selection is made among kernel-based pattern elements and selected elements are communicated. Not all of the kernel-based pattern elements known to the central node are active elements in the candidate solution. Moreover, in the first embodiment, the active elements may change from one iteration to the next. The central node may select a new pattern element communicated in block 170, or may create and select a new functional from a data item communicated in block 170, or may choose to make active a kernel-based pattern element from an earlier iteration based on the statistics communicated in block 160. In some iterations, however, the set of active elements may be kept fixed and only the relative weights given to the elements in the candidate solution will be updated.

In block 190, the updated solution is communicated from the peripheral sites to the central node. Then, control returns to block 125 to begin another iteration.

Figure 3:
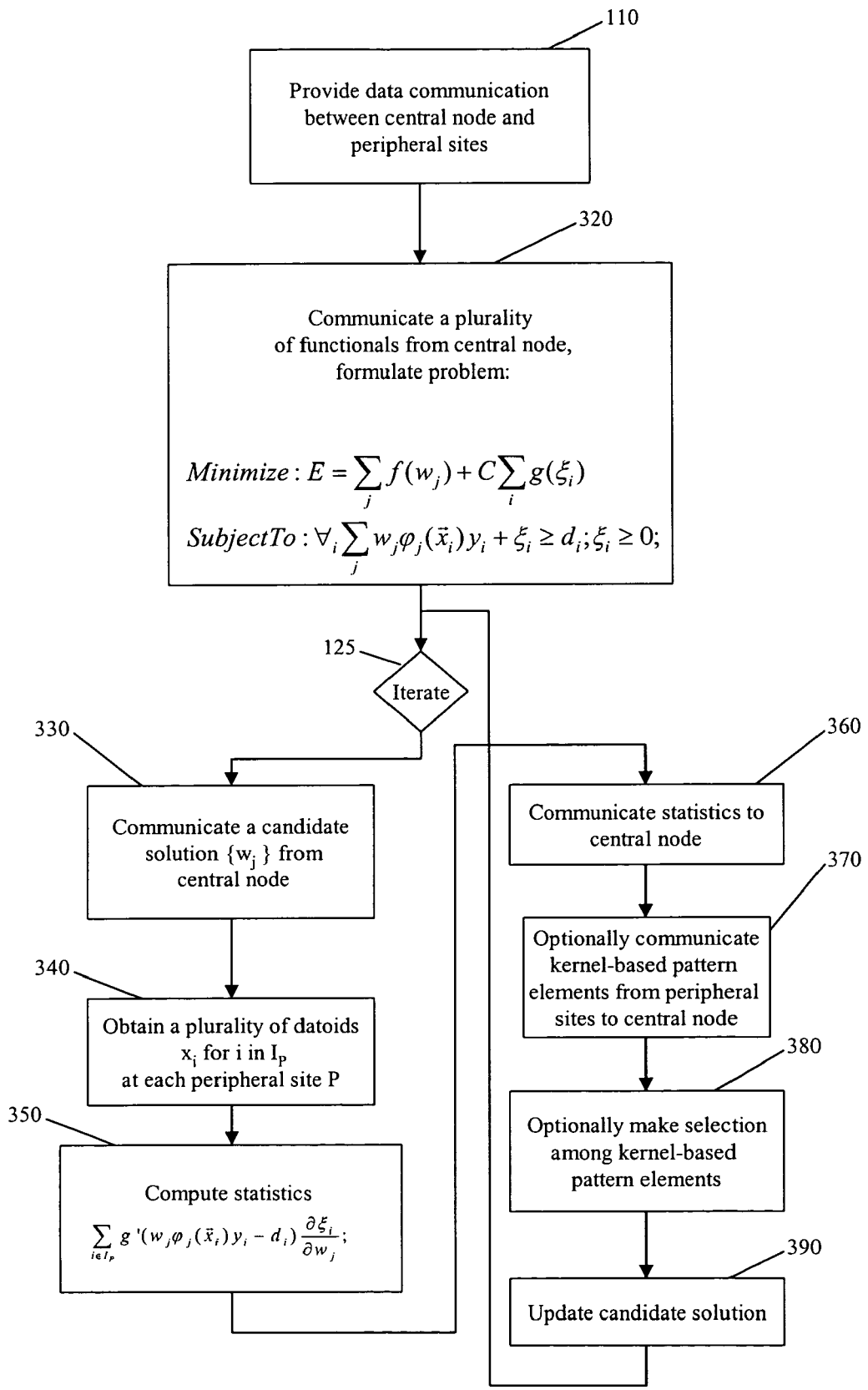
FIG. 3 is a flowchart of a pattern recognition training method according to a second embodiment of the invention.

Referring now to FIG. 3, a second embodiment is shown. It should be noted, that although the index k is dropped from the discussion of FIG. 3 to simplify the discussion, in the second embodiment as shown in FIG. 3 it may be used for any or all of the disagreements types represented by different values of the index k. Thus, the process of FIG. 3 might be used repeatedly to solve constrained optimization problems associated with different values of k. As explained in the phoneme boundary example above, some embodiments may have more than a million distinct values for k, the index of the disagreement type.

Block 110 of FIG. 3 is the same as block 110 of FIG. 1.

In block 320 of FIG. 3, however, unlike block 120 of FIG. 1, functionals are communicated and a particular form of constrained optimization problem is formulated, namely $$\text{Minimize: } E = \sum_j f(w_j) + C \sum_i g(\xi_i) \quad (0.6)$$

$$\text{SubjectTo}: \forall_i \sum_j w_j \varphi_j(\vec{x}) y_i + \xi_i \geq d_i; \xi_i \geq 0;$$

Note that both the objective functions (0.4) and (0.5) are special cases of the form (0.6), for particular choices for f(.) and g(.), and that the constraints in (0.6) have the same form as (0.2).

In block 125, the iteration of the process is controlled, in a manner similar to that described in block 125 in FIG. 1.

In block 330, in the second embodiment, the functionals $\phi_j(.)$ have already been communicated, so a candidate solution can be specified just by communicating its set of weights $\{w_j\}$. The central node communicates the weights to the peripheral sites.

In block 340, a plurality of data items are obtained at each peripheral site. In the second embodiment, data collection is an on-going process, so that in a given iteration there may be new data items at some peripheral sites that were not known during previous iterations.

In block 350, which is an instance of block 150 from FIG. 1, statistics are computed at the peripheral sites, to be communicated back to the central node. In particular, for each peripheral node P, block 350 computes for the second embodiment shown in FIG. 3 the quantity $$\sum_{i \in Ip} g'(w_j \varphi_j(\vec{x}_i) y_i - d_i) \frac{\partial \xi_i}{\partial w_j}. \quad (0.7)$$

Essentially, expression (0.7) tells the central node the net change in the objective function for a change in the weight $w_j$, summed over the data items at peripheral node P. Other implementations of the second embodiment with different solution procedures will communicate different statistics. In general, the purpose of the statistics computed in block 350 will be to enable the central node to update the candidate solution for the current iteration.

In block 360, which is an instance of block 160 of FIG. 1, the statistics computed in block 350 are communicated back to the central node from the peripheral sites, whereby, among other things, the sums of the form of (0.7) summed across all the peripheral nodes are computed.

In block 370, which is an instance of block 170 of FIG. 1, kernel-based pattern elements are communicated from the peripheral sites to the central node, as an optional step. For the second embodiment shown in FIG. 3, these kernel-based pattern elements will be functionals or data items from which the central node can create functionals. In other possible implementations of the second embodiment, the central node might also use data items to formulate new constraints. Communicating these kernel-based pattern elements is not an essential part of the iterative solution of a given problem of the form (0.6), and these elements need not be communicated every iteration. However, in the first and second embodiments, in particular when the data collection is an on-going process, a given peripheral node may determine that a particular data item is a good candidate for use in creating a functional or for other special attention by the central node. For example, a peripheral node may observe that $$g'(w_j \varphi_j(\vec{x}_i) y_i - d_i) \frac{\partial \xi_i}{\partial w_j}$$

is large for a particular data item $\vec{x}_j$. The peripheral site may use a particular kernel function to form a functional from the data item, or may communicate the data item itself to the central node.

In block 380, which is an instance of block 180 of FIG. 1, a selection is made among the kernel-based pattern elements available at the central node. That is, the functionals to be used in the candidate solution may be changed from one iteration of the process to the next. In particular, new functionals may be chosen from the kernel-based pattern elements communicated in block 370 and old functionals may be dropped. In the second embodiment shown in FIG. 3, a new functional is introduced with an arbitrarily chosen small weight $w_j$, which will be trained to a larger value in later iterations, according to statistics from all of the peripheral sites.

In block 390, the candidate solution is updated. In block 390, a process is performed to seek to find the optimum set of weights $\{w_j\}$ to minimize E in the problem (0.6). For functions f(.) and g(.) with continuous derivatives, this optimization may be done by gradient descent or other methods well known to those skilled in the art of mathematical programming, in particular in the art of solving convex programming problems, including quadratic programming and linear programming problems. Functions, such as f(x)=|x|, with discontinuous derivatives may be approximated by functions with continuous derivatives. Then, at each iteration, the weights may be updated for example by $$w_j^{k+1} = w_j^k + \Delta w_j^k \delta^k \quad (0.8)$$

$$\Delta w_j^k = -\left( f'(w_j) - C \sum_i g'(w_j \varphi_j(\vec{x}_i) y_i - d_i) \frac{\partial \xi_i}{\partial w_j} \right).$$

Where $\delta^k$ is an adaptively estimated step size, which is made smaller if the updated weights do not produce a lower value for E than the previous weights and which is made larger otherwise. Many variations on the gradient descent update formula are known to those skilled in the art of constrained optimization and convex programming.

After block 390 is complete, control is then returned to block 125 to begin the next iteration.

Figure 4:
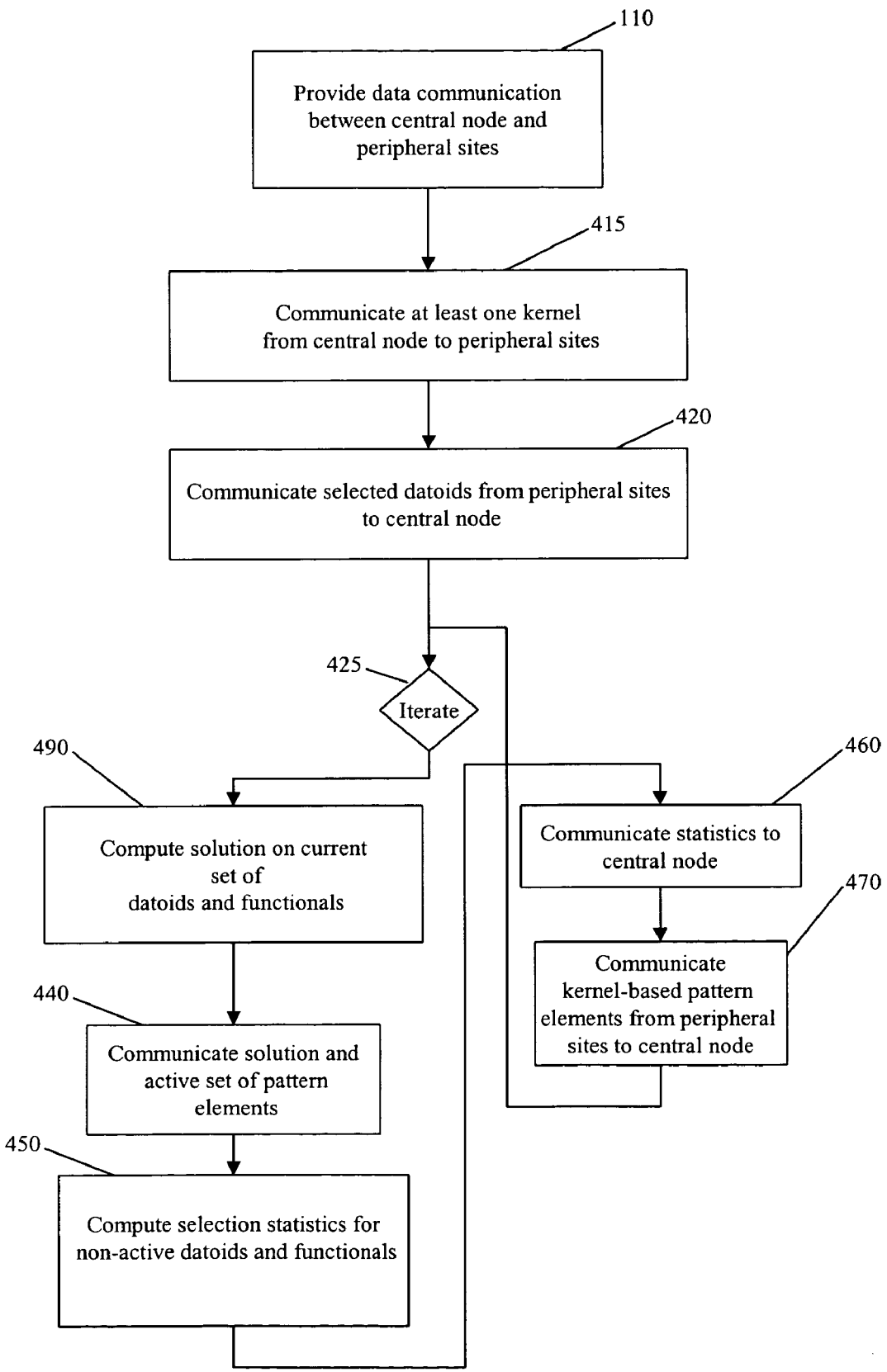
FIG. 4 is a flowchart of a pattern recognition training method according to a third embodiment of the invention.

FIG. 4 shows a third embodiment using a different strategy to support distributed computation. In the third embodiment illustrated in FIG. 4, the overall optimization problem is treated as a family of optimization problems. The central node computes the optimum solution to a member of this family of optimization problems and then blocks of data are communicated back and forth between the central node and the peripheral sites to specify the next member of the family to be solved.

In the third embodiment, the optimization problem takes the form $$\text{Minimize: } E = \sum_j |w_j| + C \sum_i \xi_i \qquad (0.9)$$

$$\text{SubjectTo: } \forall_i \sum_j w_j a_{i,j} + \xi_i \ge d_i; \xi_i \ge 0; \quad a_{i,j} = \varphi_j(\vec{x}_i) y_i$$

Thus, the optimization problem is a (primal) linear programming problem whose dual is given by $$\text{Maximize: } D = \sum_i d_i \lambda_i \qquad (0.10)$$

$$\text{SubjectTo: } \forall_j \left| \sum_i \lambda_i a_{i,j} \right| \le 1; \forall_i \ 0 \le \lambda_i \le C;$$

$$a_{i,j} = \varphi_j(\vec{x}_i) y_i$$

Block 110 of FIG. 4 is the same as block 110 of FIG. 1. It provides for data communication between a central node and a plurality of peripheral sites in order to compute solutions to a series of problems of the form (0.9) and (0.10).

In block 415, at least one kernel function is communicated from the central node to the peripheral sites. These kernel functions are communicated to the peripheral sites in this embodiment so that each particular peripheral site will be able to form new functionals from the data items obtained at that particular peripheral site.

In block 420, an initial set of data items is communicated from the peripheral sites to the central node. At each iteration of the third embodiment, the central node solves a linear programming problem of the form of (0.9) and (0.10) based on constraints and functionals derived from data items that have been communicated to the central node in the current or an earlier iteration. The initial set of data items to be communicated by block 420 may be selected arbitrarily, for example, they can be chosen at random from the data items obtained at each peripheral site, up to the system-imposed limitations on the bandwidth or data communication capacity.

In block 425, the iteration of the solution process is controlled. However, in the third embodiment unlike the previously described embodiments, each step of the iteration controlled in block 425 will itself be a multi-step process in which a member of the family of optimization problems is solved at the central node.

Techniques for solving linear programming problems such as (0.9) and (0.10) are well-known to those skilled in the art of mathematical programming. However, in the third embodiment of this invention, there may be tens of thousands to millions of disagreement event types and hence of constrained optimization problems of the form (0.9). Moreover, each particular constrained optimization problem may involve millions of variables and constraints. Therefore, the third embodiment solves the overall problem of the form (0.9) and (0.10) as a sequence of smaller problems of the same form. Each problem in the sequence of smaller problems is solved at the central node, with communication between the central node and the peripheral sites to determine the next problem in the sequence. The problems in the sequence all have the same form, but differ as to the sets of data item-based constraints and sets of functionals that are considered "active."

In block 490, a solution is obtained for the current set of data items and functionals. The order of the blocks in FIG. 4 are re-arranged slightly from the order of blocks in FIG. 1 because there is a need to compute an initial solution inside the iteration. If there are data items which have not yet been used to create corresponding functionals, such functionals are first created in block 490. Let $K_l(.,.)$ be any of the designated set of kernel functions. Let $\vec{x}_j$ be any data item then, if it has not already done so, the following functional is created in block 490

$$\phi_{l,j}(.) = K_l(., \vec{x}_j) \qquad (0.11)$$

Then, in block 490 the solution to the problems (0.9) and (0.10) is computed for the current data items and functionals using any of the techniques for solving linear programming problems that are well-known to those skilled in the art of mathematical programming, such as the dual simplex method, which is illustrated for the dual problem (0.10) in pseudo-code B below.

In block 440, the current solution is communicated from the central node to the peripheral sites. In the third embodiment, it communicates not only the weights $\{w_j\}$ from the primal problem and the Lagrange multipliers $\{\lambda_i\}$ from the dual problem, but also all the data items and functionals that are "active" in the solution. A data item $x_i$ is considered "active" if the corresponding inequality constraint is actually satisfied at the solution point as an equality, that is $$\sum_j w_j \varphi_j(\vec{x}_i) y_i = d_i.$$

Similarly, a functional $\phi_j(.)$ is "active" if the corresponding inequality constraint in the dual problem is actually satisfied as an equality $$\sum_i |\lambda_i a_{i,j}| = 1.$$

Except in case of degeneracy, an active functional will have a weight $w_j > 0$ and an active data item will have a Lagrange multiplier $0 < \lambda_i < C$.

Notice that, in the third embodiment, data items obtained at one peripheral site (and the corresponding functionals) are not necessarily known at other peripheral sites. Block 440, therefore, assures that the active data items and functionals are known at all the peripheral sites.

In block 450, statistics are computed at each of the peripheral sites. At a particular peripheral site P, let $I_P$ be the set of data items that has been obtained at site P and $J_P$ be the set of functionals corresponding to data items obtained at site P. Let $I_A$ be the set of active data items and $J_A$ be the set of active functionals. Then, in block 450, $a_{i,j} = \phi_j(\vec{x}_i) y_i$ is computed for all pairs $<i,j>$ such that $(i \in I_P \wedge j \in I_A) \vee (i \in I_A \wedge j \in J_P)$. That is, $a_{i,j}$ is computed for all pairs for which one element is in the set obtained at the particular peripheral site P and the other element in the pair is in the active set.

Then, in block 450, constraint satisfaction statistics are computed for the data items and functionals obtained at the peripheral site P. That is, block 450 computes $$\forall_{i \in I_P} \xi_i = \sum_j w_j a_{i,j} - d_i;$$

$$\forall_{j \in J_P} \beta_j = 1 - \left|\sum_i \lambda_i a_{i,j}\right|$$

(0.12)

Note that if $\xi_i \geq 0$ and $\beta_j \geq 0$ for all i and j at all peripheral sites, then all constraints are satisfied in both the primal and the dual problem and an optimal feasible solution has been obtained. However, in the third embodiment, data continues to be collected on an on-going basis, so the iterative solution process would continue, taking account of new data as it is obtained.

In block 460, the statistics $\xi_i$ for $i \in I_P$ and $\beta_j$ for $j \in J_P$ are communicated from each peripheral site back to the central node.

In block 470, a selection is made from among the data items for which $\xi_i < 0$ and the functionals for which $\beta_j < 0$, and whereby the selected data items and functionals are communicated from each peripheral site to the central node. If, for a particular peripheral site for a particular iteration there are no data items for which the constraint satisfaction statistics are negative, then none are communicated. If the quantity of data items and functionals for which the constraint satisfaction statistics are negative exceeds a communications limit, then the particular data items and functionals to be communicated may be selected according to a specified criterion. For example, the data items and functionals to be communicated may be selected as the ones for which the corresponding statistics are the most negative, or they may be selected randomly. Because the solution of the constrained optimization problem is an on-going iterative process, not all items need to be communicated in any one iteration.

In the third embodiment, many different disagreement event type problems can be solved simultaneously, so the data communications bandwidth will be shared among all the disagreement event types. In the third embodiment, the data communication bandwidth will be shared equally among all the disagreement event types, except that if at a particular peripheral site for a particular iteration a given disagreement event type needs less than its allocated share of data communication bandwidth, then that bandwidth is redistributed for use by the other disagreement event types.

Blocks 460 and 470 may use any of the means of data communication that are well-known to those skilled in the art of communication among computer networks. However, there are special characteristics of the data communications required for the third embodiment illustrated in FIG. 4 which makes a particular data transfer mechanism practical in this embodiment. In the third embodiment, there is a large quantity of data which must be communication for each iteration, but there is also a large amount of computation which must be done at the central node to compute the current solution. Thus each iteration of the process controlled in block 425 may take a substantial period of time, such as a full day or even several days. Thus, in the third embodiment, there is sufficient time to physically transport data between the peripheral sites and the central node for each iteration. The data capacity of computer data storage media is very large. For example, an external hard disk may have a capacity of 400 gigabytes or more. Such an external hard disk may be shipped thousands of miles economically overnight. The cost of data communication bandwidth capable of transmitting 400 gigabytes overnight may be much greater.

Thus, in one possible implementation of the third embodiment, the communication done in blocks 460, 470 and 440 of FIG. 4 is done by the physical shipment of storage media (or complete external storage devices) between the peripheral sites and the central node. Even as both communication bandwidth and storage media capacity grow in the future, it may continue to be more economical for very large problems for data to be transferred by physical shipment of storage media or devices.

Figure 5:
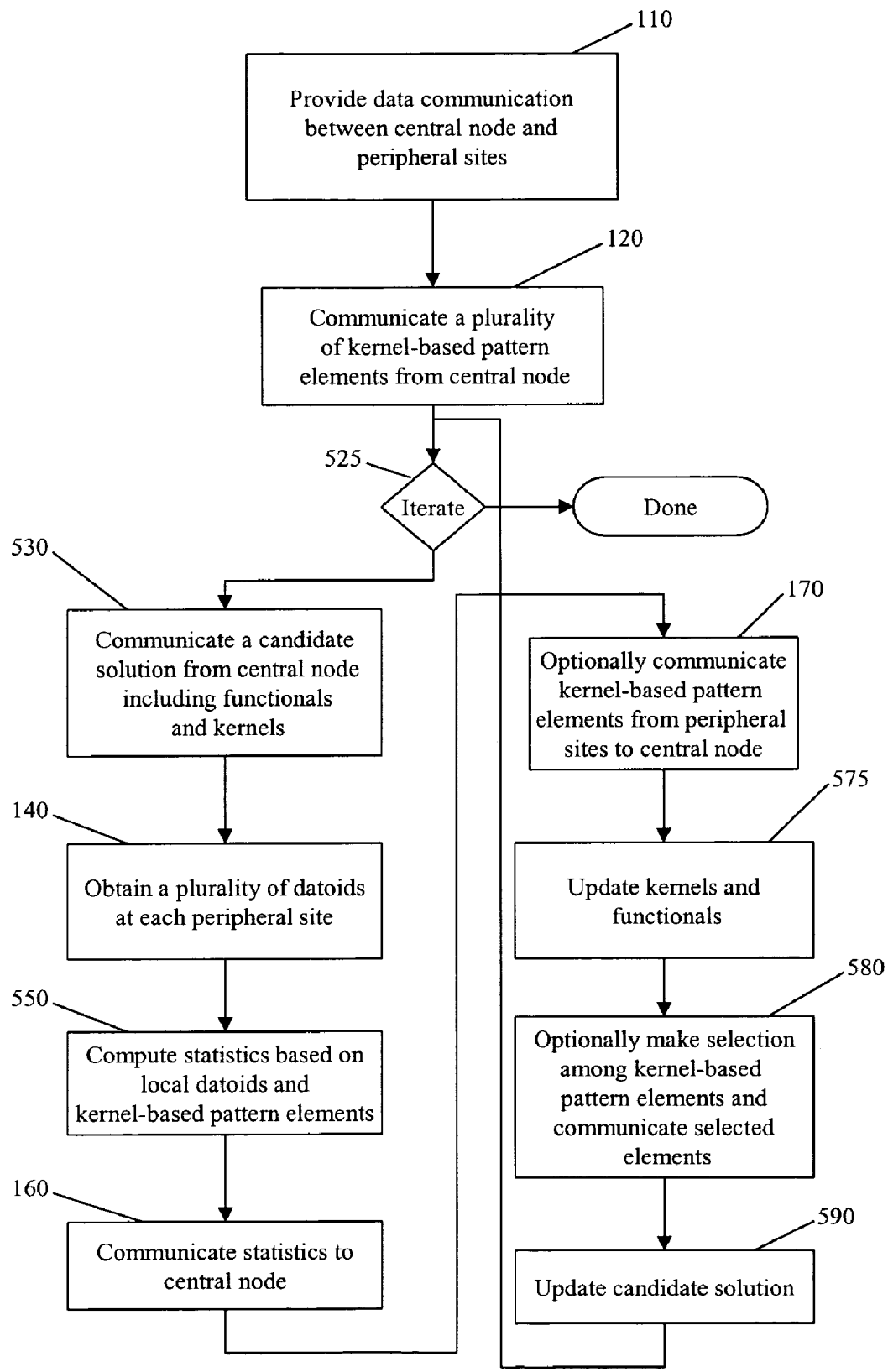
FIG. 5 is a flowchart of a pattern recognition training method according to a fourth embodiment of the invention.

FIG. 5 illustrates a fourth embodiment in which kernel functions and functionals are re-estimated. In the fourth embodiment illustrated in FIG. 5, the data space D is itself a vector space, which has not been a requirement for the embodiments described previously. In the fourth embodiment, at least some of the kernels and functionals are estimated from the statistics of clusters of data items. In applications in speech recognition, for example, the data space D may be the space of acoustic feature vectors. As another example, the data space D may be a space of feature vector associated with linguistic features of words. Such feature vectors may be determined by eigenvector analysis, for example, by singular value decomposition of the matrix of word co-occurrences in a training corpus of texts.

The fourth embodiment illustrated in FIG. 5 is similar to the first embodiment illustrated in FIG. 1 except that, in addition to the statistics such as those computed in block 350 of FIG. 3 or block 450 of FIG. 4, in block 550 statistics are also computed such that the central node can update the kernel functions and functionals.

Blocks 110 and 120 of FIG. 5 are the same as the corresponding blocks of FIG. 1.

Block 525 of FIG. 5 is similar to block 125 of FIG. 1, with a difference to be discussed later.

In block 530, updated estimates of the kernel functions and functionals are communicated from the central node to the peripheral nodes, as well as the candidate solution in terms of these functionals.

Block 140 of FIG. 5 is the same as block 140 of FIG. 1.

In block 550, statistics computed by other instances of block 150 are computed, and, in addition, the following statistics are computed:

First, each data item $\vec{x}_i$ obtained at peripheral site P is classified into a particular cluster K. This clustering may be done by any well-known clustering technique, such as grouping each data item with the closest cluster. In the fourth embodiment, the clustering is done separately for each event type. For training data, the event type is determined by the known correct answer. The clustering does not depend on disagreement events, so there is no consideration of alternate hypotheses for this clustering operation. For each cluster at each peripheral site, the following statistics are computed:

$$S_{n,P,K} = \sum_{i \in I_{P,K}} [\vec{x}_i]_n$$

$$SS_{m,n,P,K} = \sum_{i \in I_{P,K}} [\vec{x}_i]_m [\vec{x}_i]_n$$

$$N_{P,K} = \|I_{P,K}\|$$

(0.13)

That is, $N_{P,K}$ is the number of elements in $I_{P,K}$.

In block 160, like block 160 of FIG. 1, the statistics computed at each of the peripheral sites are communicated back to the central node.

Block 170 of FIG. 5 is the same as block 170 of FIG. 1.

In block 575, updated kernels and functionals are computed. First, the statistics (0.13) are communicated in block 575 from the peripheral sites.

$$S_{n,K} = \sum_P S_{n,P,K} \quad (0.14)$$

$$SS_{m,n,K} = \sum_P SS_{m,n,P,K}$$

$$N_K = \sum_P N_{P,K}$$

Then, the means and covariances are computed in block 575:

$$\mu_{n,K} = S_{n,K}/N_K$$

$$c_{m,n,K} = SS_{m,n,K}/N_K - \mu_{m,K}\mu_{n,K} \quad (0.15)$$

Then, for each cluster K, the matrix $[C_K]_{m,n} = c_{m,n,K}$ and the kernel function $K(\vec{x}, \vec{y}) = \exp(-\vec{x}^T C_K^{-1} \vec{y}/2)$ are formed in block 575. New functional are formed from the updated kernel functions and existing data items. In addition, functionals may be formed using data items which are computed as mean vectors of clusters and updated by (0.15).

Block 580 is similar to block 180 of the first embodiment as shown in FIG. 1 or to block 380 of the second embodiment as shown in FIG. 3, except with updated values for the kernels and functionals.

Block 590 is similar to block 190 of the first embodiment as shown in FIG. 1 or to block 390 of the second embodiment as shown in FIG. 3 or block 490 of the third embodiment as shown in FIG. 4, except that updated functionals are used.

After block 590 has completed, control then returns to block 525. Block 525 is similar to block 125 of the first embodiment as shown in FIG. 1. However, an extra criterion must be satisfied by any convergence test that might be applied in block 525. The convergence criterion in block 525 will include a test that the estimates of the means and covariances of the clusters have stabilized, such as that the change in the means and covariances estimated in one iteration from the previous iteration is less than some specified value.

FIG. 5 should be understood as describing a process that may be used in addition to the aspect of formulating and solving a constrained optimization problem. Thus, the fourth embodiment is a complement that can be used in addition to the first through third embodiments described in reference to FIGS. 1, 3 and 4.

Pseudo-code A: Dynamic Time Warping

```
For all data frames t {
    For all states s in hypothesized sequence {
        If (alpha(s-1,t-1) >alpha(s,t-1)) {
            back(s,t) = s-1;
            alpha(s ,t) = alpha(s-1,t-1);
        } else {
            back(s,t) = s;
            alpha(s,t) = alpha(s,t-1);
        }
        alpha(s,t) =alpha(s,t) + score(data(t) given s);
    }
}
```

```
-continued

BestState(T) = EndState;
For t going down from T-1 to 0 {
    BestState(t) = back(BestState(t +1),t +1);
}
```

Pseudo-code B: Solving problem (0.10) using the dual simplex method

Rewrite problem in standard form:

$$\text{Maximize: } D = \sum_i d_i \lambda_i \quad (0.16)$$

$$\text{SubjectTo: } \forall_j \sum_i \lambda_i a_{i,j} + \kappa_j^+ = 1;$$

$$\forall_j -\sum_i \lambda_i a_{i,j} + \kappa_j^- = 1;$$

$$\forall_i \lambda_i + \pi_i = C;$$

$$\forall_i \lambda_i \geq 0; \pi_i \geq 0;$$

$$\forall_j \kappa_j^+ \geq 0; \kappa_j^- \geq 0;$$

Note that $\forall_i \lambda_i = 0$ provides an initial feasible point. To simplify notation, represent all the variables a single vector $\vec{x} = <\lambda_l, \ldots, \lambda_i, \ldots, \lambda_j^+, \ldots, \kappa_j^+, \ldots, \kappa_j^-, \ldots \pi_i, \ldots>$. Note that, for the initial feasible point, all the other variable can be evaluated in terms of the $\lambda_i$ and the constant 1. Thus, the problem may be rewritten in the form:

$$\text{Maximize: } D = \vec{d}^{(k)} \vec{x}_{B^{(k)}}$$

$$\text{SubjectTo: } \vec{x}_{N^{(k)}} = \hat{A}^{(k)} \vec{x}_{B^{(k)}} + \vec{b}^{(k)}; \vec{x}_{N^{(k)}} \geq 0; \quad (0.17)$$

where $\vec{x}_{B^{(k)}}$ is a particular subset of the set of variables, and $\vec{x}_N$ is the remaining set of variables. The superscript (k) represents that the selected set will change from one step of the simplex method to the next and the vectors and the matrix A will be recomputed. Initially, $B = B^{(k)}$ is the set of lamdas $\{\lambda_i\}$.

The simplex method includes a sequence of steps. In each step, a variable is selected to be removed from the set B and a new variable is selected to be added to the set B. The selection is made and A, b and d are recomputed such that the constraints of (0.17) are always satisfied and the value of the objective is increases from step to step. The simplex method maintains dual feasibility. That is, $\vec{b}^{(k)} \geq 0$. This method is shown in the following pseudo-code, for example:

For k=0 until done {

If $[\hat{d}^{(k)}]_i \leq 0$ for all i in $B^{(k)}$ then done, current solution is optimum.

Select q such that $[\hat{d}^{(k)}]_q > 0$ (May select any such q; one possible implementation is to always choose the minimum.)

Let M be the set such $[\hat{A}^{(k)}]_{m,q} < 0$ for m in M. (If M were empty, the dual objective value would be unbounded, which is impossible for this problem because the primal is feasible.)

Choose p∈M such that $[\hat{b}^{(k)}]_p/[\hat{A}^{(k)}]_{p,q} = \max_{m \in M}\{[\hat{b}^{(k)}]_m/[\hat{A}^{(k)}]_{m,q}\}$ (This is choosing the maximum of a set of negative numbers. If there is a tie choose p at random among those tied. This choice maintains $\vec{b}^{(k)} \geq 0$.)

Recompute:

$$[\hat{A}^{(k+1)}]_{p,q} = 1/[\hat{A}^{(k)}]_{p,q}$$

$$[\hat{A}^{(k+1)}]_{i,q} = [\hat{A}^{(k)}]_{i,q}/[\hat{A}^{(k)}]_{p,q}, \text{ for } i \neq p$$

$$[\hat{A}^{(k+1)}]_{p,j} = -[\hat{A}^{(k)}]_{i,q}/[\hat{A}^{(k)}]_{p,q}, \text{ for } j \neq q$$

$$[\hat{A}^{(k+1)}]_{i,j} = [\hat{A}^{(k)}]_{i,j} - [\hat{A}^{(k)}]_{i,q}/[\hat{A}^{(k)}_{p,q}], \text{ for } i \neq p, j \neq q$$

$$[\hat{b}^{(k+1)}]_p = -[\hat{b}^{(k)}]_p/[\hat{A}^{(k)}]_{p,q}$$

$$[\hat{b}^{(k+1)}]_i = [\hat{b}^{(k)}]_i - [\hat{b}^{(k)}]_p [\hat{A}^{(k)}]_{i,q}/[\hat{A}^{(k)}]_{p,q}, \text{ for } i \neq p$$

$$[\hat{d}^{(k+1)}]_q = [\hat{d}^{(k)}]_q/[\hat{A}^{(k)}]_{p,q}$$

$$[\hat{d}^{(k+1)}]_j = [\hat{d}^{(k+1)}]_j/[\hat{A}^{(k)}]_{p,q}$$

}

Figure 6:
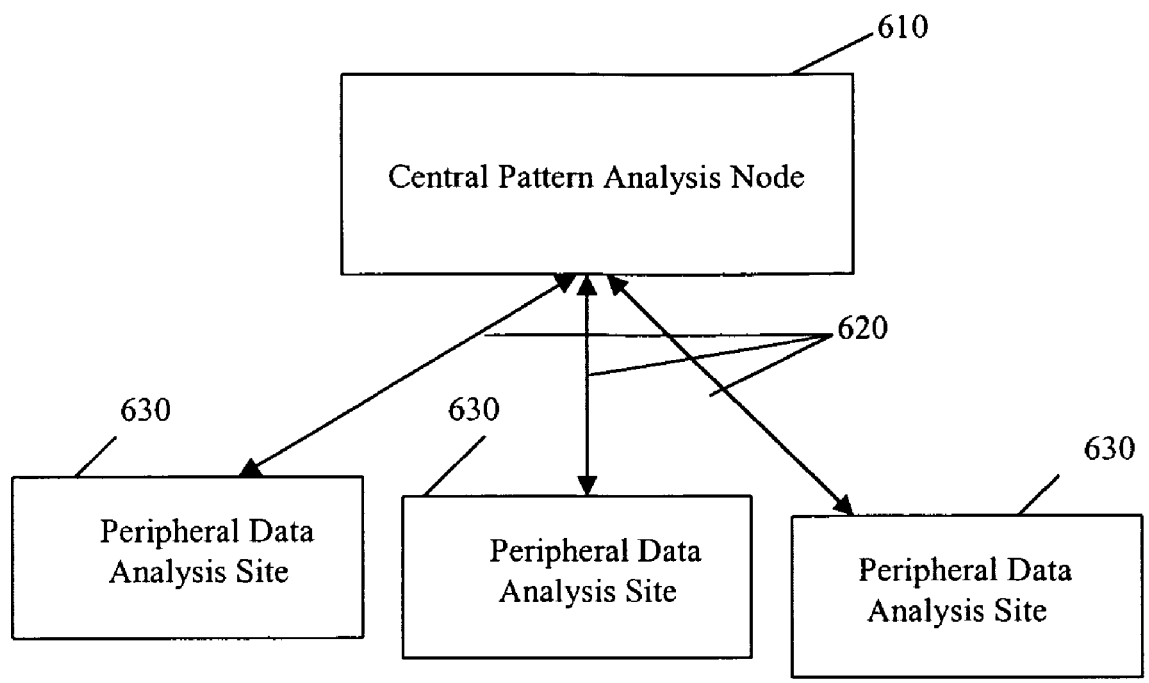
FIG. 6 is a block diagram showing a distributed pattern recognition training system according to at least one of the embodiments of the invention.

FIG. 6 shows a distributed architecture according to the first embodiment, whereby a central pattern analysis node 610 is communicatively connected to a plurality of peripheral data analysis sites 630 by way of bi-directional communication paths 620. The architecture shown in FIG. 6 may be utilized for any of the other described embodiments.

A fifth embodiment of the invention will be described below, for performing pattern scoring. In a first step, a plurality of template data items are obtained. In a second step, a plurality of kernel functions are obtained. For each of said plurality of template data items, a plurality of functionals are created, where each particular functional is associated with a particular template data item and a particular kernel function. Next, the score for each sample data item is computed based on the value of a linear combination of a subset of the plurality of functionals. For each pattern to be scored, a selection is made of the particular functionals to be used and the weight to be given to each particular functional based on a constrained optimization problem which minimizes a function of the weights for a given amount of separation between the pattern classes.

In the fifth embodiment, the kernel functions may correspond to reproducing kernels in a Hilbert space, and the template data items may correspond to word sequences. The obtaining of the kernel functions may be performed by obtaining a plurality of subsets of word context positions, and obtaining a metric based on word comparisons in each of the plurality of subsets of word context positions. The obtaining of the kernel functions may alternatively or additionally be performed at least in part by parsing the word sequences according to a specified grammar. The obtaining of the kernel functions may alternatively or additionally be performed at least in part on estimated state sequence of a hidden stochastic process generating each given observed word sequence.

At least one of the subsets of word context positions may include at least one position earlier in the word sequence than a designated word position. At least one of said subsets of word context positions may include at least one position later in the word sequence than the designated word position.

The constrained optimization problem performed in the last step of the fifth embodiment may be a linear programming problem or a quadratic programming problem, for example.

A sixth embodiment of the invention will be described below, for performing speech recognition. In a first step, a base speech recognition process is performed, which generates utterance hypotheses. Then, a representation of a set of event types which may occur in utterance hypotheses generated by said base speech recognition process is obtained. Next, a plurality of hypothesized event pair discrimination models are obtained. Next, a plurality of utterance hypotheses from the base speech recognition process are obtained. Then, at least one pair from the plurality of utterance hypotheses is selected. For each selected pair of utterance hypotheses, at least one point in time is selected such that within a specified interval of the point in time, a first hypothesized particular event happens according to a first hypothesis of the pair of utterance hypotheses and a second hypothesized particular event happens according to a second hypothesis of the pair of utterance hypotheses. Then, data observations are obtained at least one point in time. Next, rescoring of the pair of utterance hypotheses is performed based at least in part on the event pair discrimination models and the data observations at the at least one point in time. Then, re-ranking is performed on the plurality of hypotheses based on the rescoring of the selected at least one pair from the plurality of hypotheses.

In one possible implementation of the sixth embodiment, each discrimination model discriminates between one particular event type that may happen according to a first candidate hypothesis generated by the base recognition process and a different particular event type that may happen within a specified interval of the same point in time according to a second candidate hypothesis generated by the base recognition process.

At least one of the discrimination models may correspond to a model that discriminates between the first hypothesized particular event and the second hypothesized particular event. At least one of the discrimination models may be obtained by training a classification system on samples of errors made by the base speech recognition process.

The training of the classification system may include distributed pattern recognition training which includes a step of providing data communication between at least one central pattern analysis node and a plurality of peripheral data analysis sites. The training also includes a step of communicating at least one kernel-based pattern element from the central pattern analysis node to the plurality of peripheral data analysis sites. The training further includes obtaining acoustic observation data at each of said plurality of peripheral data analysis sites. The training still further includes communicating statistics from the plurality of peripheral data analysis sites to the central pattern analysis node. The training also includes updating the at least one kernel-based pattern element based on the statistics.

According to a seventh embodiment of the invention, there is provided a two-stage speech recognition method. The method includes a step of obtaining a base recognition process which generates utterance hypotheses. The method also includes a step of obtaining a representation of the set of event types which might occur in utterance hypotheses generated by the base speech recognition process. The method further includes a step of obtaining a plurality of self-normalizing event detection verification models trained at least in part on errors made by the base speech recognition system. The method still further includes a step of obtaining a plurality of hypotheses from the base speech recognition system. For each of said plurality of hypotheses, there is performed a step of obtaining a list of hypothesized events which happen according to the hypothesis and the hypothesized time at which each of the events occurs. After this is performed, there is performed a step of rescoring each of the plurality of hypotheses by adding the output score from the event detection verification model for each event in the list of hypothesized events. Then, re-ranking is performed on the plurality of hypotheses based on the rescoring, and the output of the two stage speech recognition method is made based on the re-ranking.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

Different embodiments of the present invention have been described according to the present invention. Many modifications and variations may be made to the techniques and structures described and illustrated herein without departing from the spirit and scope of the invention. Accordingly, it should be understood that the apparatuses described herein are illustrative only and are not limiting upon the scope of the invention.

What is claimed is:

1. A distributed pattern recognition training method, comprising:
    providing data communication between at least one central pattern analysis node and a plurality of peripheral data analysis sites;
    communicating, from said at least one central pattern analysis node to said plurality of peripheral data analysis sites, a plurality of kernel-based pattern elements; and
    performing a plurality of iterations of pattern template training at each of said plurality of peripheral data analysis sites,
    wherein each iteration of pattern template training comprises:
        communicating, from said at least one central pattern analysis node, a candidate solution to a pattern discrimination problem computable from said plurality of kernel-based pattern elements;
        at each of said plurality of peripheral data analysis sites, obtaining a plurality of data items; and
        at each of said plurality of peripheral data analysis sites, computing statistics derived from said candidate solution, said plurality of kernel-based pattern elements and said plurality of data items.

2. The distributed pattern recognition training method according to claim 1, wherein each iteration of pattern template training further comprises:
    communicating said statistics from said plurality of peripheral data analysis sites to said central pattern analysis node; and
    performing a pattern template analysis at said central pattern analysis node to update said candidate solution based at least in part on said statistics communicated from said peripheral data analysis sites.

3. The distributed pattern recognition training method according to claim 2, further comprising:
    for at least one of said iterations of pattern template training, communicating at least one candidate kernel-based pattern element from at least one of said peripheral data analysis sites to said central pattern analysis node; and
    for at least one of said iterations of pattern template training, performing a selection operation among said plurality of kernel-based pattern elements and said at least one candidate kernel-based pattern element to change the number of said kernel-based pattern elements used in said candidate solution to be communicated to said plurality of peripheral data analysis sites in the next iteration of pattern template training.

4. The distributed pattern recognition training method according to claim 2, wherein said statistics communicated from a particular one of said plurality of peripheral data analysis sites include a vector proportional to the direction in which to change one of said kernel-based pattern elements to get the greatest rate of improvement of a specified objective function.

5. The distributed pattern recognition training method according to claim 2, wherein said performing a pattern template analysis at said central analysis node further comprises solving a constrained optimization problem for a selected subset of said kernel-based pattern elements.

6. The distributed pattern recognition training method according to claim 1, wherein said pattern recognition is speech recognition.

7. The distributed pattern recognition training method according to claim 1, wherein said pattern recognition is classification of the output of a speech recognition system.

8. The distributed pattern recognition training method according to claim 1, further comprising:
    obtaining a set of data observations at least one of said plurality of peripheral data analysis sites, wherein said set of data observations include acoustic feature observations.

9. The distributed pattern recognition training method according to claim 1, further comprising:
    obtaining a set of data observations at least one of said plurality of peripheral data analysis sites, wherein said set of data observations include sequences of words,
    wherein each iteration of pattern template training further comprises:
        communicating said statistics from said plurality of peripheral data analysis sites to said central pattern analysis node; and
        performing a pattern template analysis at said central pattern analysis node to update said candidate solution based at least in part on said statistics communicated from said peripheral data analysis sites.

10. The distributed pattern recognition training method according to claim 1, wherein said plurality of kernel-based pattern elements communicated from said central pattern analysis node to said plurality of peripheral data analysis sites includes a plurality of data items.

11. The distributed pattern recognition training method according to claim 10, further comprising creating a plurality of functionals based on said plurality of data items and at least one reproducing kernel function.

12. The distributed pattern recognition training method according to claim 11, wherein at least one of said plurality of reproducing kernel functions is a function of the covariance matrix of a plurality of data vectors.

13. The distributed pattern recognition training method according to claim 11, wherein said statistics communicated from a particular one of said plurality of peripheral data analysis sites include a vector proportional to the direction in which to change at least one of said reproducing kernel functions to get the greatest rate of improvement of the degree of fit between said plurality of peripheral data items obtained at said particular one of said data analysis sites and a family of functionals based on said at least one reproducing kernel function.

14. The distributed pattern recognition training method according to claim 1, wherein said plurality of kernel-based pattern elements communicated from said central pattern analysis node to said plurality of peripheral data analysis sites includes a plurality of functionals.

15. The distributed pattern recognition training method according to claim 1, further comprising communicating a plurality of reproducing kernel functions from said central pattern analysis node to said plurality of peripheral data analysis sites.

16. The distributed pattern recognition training method according to claim 1,
wherein said pattern template analysis performed at said central pattern analysis node includes solving a constrained optimization problem,
wherein each iteration of pattern template training further comprises:
communicating said statistics from said plurality of peripheral data analysis sites to said central pattern analysis node; and
performing a pattern template analysis at said central pattern analysis node to update said candidate solution based at least in part on said statistics communicated from said peripheral data analysis sites.

17. The distributed pattern recognition training method according to claim 16, wherein said constrained optimization problem is a convex programming problem.

18. The distributed pattern recognition training method according to claim 16, wherein said constrained optimization problem is a linear programming problem.

19. The distributed pattern recognition training method according to claim 16, wherein said constrained optimization problem is a quadratic programming problem.

20. The distributed pattern recognition training method according to claim 1, wherein said plurality of kernel-based pattern elements contains at least one data item,
the method further comprising:
matching said plurality of kernel-based pattern elements to a plurality of peripheral data items.

21. The distributed pattern recognition training method according to claim 20, wherein the matching step comprises computing the distance between said at least one data item from said plurality of kernel-based pattern elements and each of a plurality of peripheral data items based on some distance metric.

22. The distributed pattern recognition training method according to claim 21, wherein said distance metric is the Euclidean distance.

23. The distributed pattern recognition training method according to claim 21, wherein said distance metric is a reproducing kernel in a Hilbert space.

24. The distributed pattern recognition training method according to claim 1, wherein at least one of said plurality of kernel-based pattern elements is a data item which is equal to a selected example data item in a set of training data.

25. The distributed pattern recognition training method according to claim 1, wherein at least one of said plurality of kernel-based pattern elements is the mean vector of a plurality of data items.

26. The distributed pattern recognition training method according to claim 1, further comprising computing constraint satisfaction statistics for kernel-based pattern elements obtained at least one of said peripheral data analysis sites.

27. The distributed pattern recognition training method according to claim 1, further comprising providing said data communication between said central pattern analysis node and said plurality of peripheral data analysis sites at least in part by utilizing a computer network.

28. The distributed pattern recognition training method according to claim 1, further comprising providing said data communication between said central pattern analysis node and said plurality of peripheral data analysis sites at least in part by physically transferring data storage media between said central pattern analysis node and said plurality of peripheral data analysis sites.

29. A computer readable storage device storing machine-readable program code for performing distributed pattern recognition training, the program code, when executed, causing a machine to perform the following steps:
providing data communication between at least one central pattern analysis node and a plurality of peripheral data analysis sites;
communicating, from said at least one central pattern analysis node to said plurality of peripheral data analysis sites, a plurality of kernel-based pattern elements; and
performing a plurality of iterations of pattern template training at each of said plurality of peripheral data analysis site,
wherein each iteration of pattern template training comprises:
communicating, from said at least one central pattern analysis node, a candidate solution to a pattern discrimination problem computable from said plurality of kernel-based pattern elements;
at each of said plurality of peripheral data analysis sites, obtaining a plurality of data items; and
at each of said plurality of peripheral data analysis sites, computing statistics derived from said candidate solution, said plurality of kernel-based pattern elements and said plurality of data items.

30. The computer readable storage device according to claim 29, wherein each iteration of pattern template training further comprises:
communicating said statistics from said plurality of peripheral data analysis sites to said central pattern analysis node; and
performing a pattern template analysis at said central pattern analysis node to update said candidate solution based at least in part on said statistics communicated from said peripheral data analysis sites.

31. The computer readable storage device according to claim 29, further comprising:
for at least one of said iterations of pattern template training, communicating at least one candidate kernel-based pattern element from at least one of said peripheral data analysis sites to said central pattern analysis node; and
for at least one of said iterations of pattern template training, performing a selection operation among said plurality of kernel-based pattern elements and said at least one candidate kernel-based pattern element to change the number of said kernel-based pattern elements used in said candidate solution to be communicated to said plurality of peripheral data analysis sites in the next iteration of pattern template training.

32. The computer readable storage device according to claim 29, wherein said pattern recognition is speech recognition.

33. The computer readable storage device according to claim 29, wherein said pattern recognition is classification of the output of a speech recognition system.

34. The computer readable storage device according to claim 29, further comprising:
obtaining a set of data observations at least one of said plurality of peripheral data analysis sites, wherein said set of data observations include acoustic feature observations.

* * * * *